United States Patent [19]
Lipschutz et al.

[11] 3,782,493
[45] Jan. 1, 1974

[54] ANTI-THEFT DEVICES

[75] Inventors: Paul Lipschutz, Croissy-Sur-Seine;
Jean Leroy, Saint-Cyr-L Ecole, both of France

[73] Assignee: Societe d'Exploitation des Brevets NEIMAN, Neuilly Seine, France

[22] Filed: Sept. 21, 1971

[21] Appl. No.: 182,385

Related U.S. Application Data

[63] Continuation-in-part of Ser. No. 47,706, June 19, 1970, Pat. No. 3,688,861.

[30] Foreign Application Priority Data

Sept. 25, 1970 France ............................... 7034733
Sept. 25, 1970 France ............................... 7034734

[52] U.S. Cl. .................... 180/114, 70/243, 70/254, 123/198 B, 123/198 D, 307/10 AT

[51] Int. Cl. ........................................... B60r 25/04

[58] Field of Search .................... 180/114, 111, 112, 180/113; 70/252, 265, 283, 254, 255; 123/198 D, 198 B; 307/10 AT

[56] References Cited

UNITED STATES PATENTS

| | | | |
|---|---|---|---|
| 3,021,913 | 2/1962 | Ouimet et al. | 180/114 |
| 3,622,718 | 11/1971 | Lipschutz | 70/252 |
| 3,398,731 | 8/1968 | Johansson | 123/198 D |
| 3,569,930 | 3/1971 | Hirama | 70/252 |
| 3,641,489 | 2/1972 | Shimomura | 180/114 |

*Primary Examiner*—Kenneth H. Betts
*Assistant Examiner*—John P. Silverstrim
*Attorney*—Nolte & Nolte

[57] ABSTRACT

A lock having a bolt engageable with a control element of an automotive vehicle and including key-operated means having a first position in which the bolt is engaged with the control element and a second position in which the bolt is disengaged therefrom, means for blocking movement of the key-operated means between both positions, and comprising an electromagnet energizable by an electrical circuit of the automotive vehicle for operating said blocking means.

4 Claims, 9 Drawing Figures

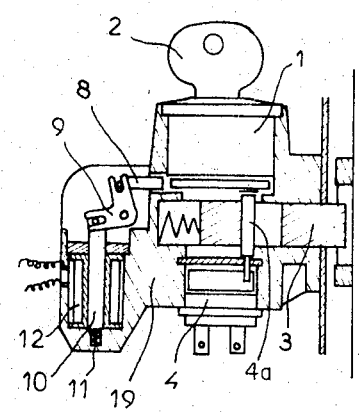

PATENTED JAN 1 1974

ANTI-THEFT DEVICES

This is a continuation-in-part of the U.S. Pat. application ser. No. 47.706 filed on June 19, 1970, now U.S. Pat. No. 3,688,861.

The present invention relates to anti-theft devices particularly applicable to automotive vehicles powered by an internal combustion engine, such anti-theft devices being adapted to prevent operating the start of the engine when the anti-theft device is in the locking position and to lock the anti-theft device when the engine is running, respectively.

Such devices are already provided for vehicles driven by non-Diesel type internal combustion engines and generally comprise a switch operatively connected to the safety lock of the anti-theft device, so as to prevent the ignition coil from being energized when the anti-theft device is in the locking position. These devices cannot be applied to a Diesel engine-driven vehicle which does not comprise any ignition coil.

The object of the invention is therefore to improve the existing anti-theft arrangements so that same be applicable to a Diesel engine-powered automotive vehicle and the invention suggests for this purpose an anti-theft device with a safety lock having a bolt adapted to engage some control element or working part of an automotive vehicle, the lock including key-operated means adapted to assume a first position in which said bolt engages said control element and a second position in which the bolt is disengaged from said control element, the improvement consisting in the provision of blocking means for holding said key-operated means against movement between said two positions, said blocking means including an electromagnet connected in an electrical circuit providing operating electrical current for the automotive vehicle and responsive to a closed condition of said circuit to cause said blocking means to unlock said key-operated means for movement between said two positions, said blocking means being responsive to an open condition of said circuit to cause said blocking means to lock said key-operated means against movement.

According to a first embodiment of the invention, said key-operated means comprise a rotor and said blocking means comprise a notched plate fastened to said rotor and a second bolt positioned adjacent to said plate and operatively associated with said electromagnet for insertion into the notch of said plate when said circuit is broken and for withdrawal from said notch when said circuit is completed.

According to a further embodiment of the invention, applicable to a Diesel engine-powered automotive vehicle having engine starting means, said electrical circuit includes first and second switches, said first switch being operatively connected to said key-operated means and said second switch being operatively connected to said engine starting means for being turned off when the engine is running and turned on when the engine is stopped.

According to still another embodiment of the invention, applicable to a Diesel engine-driven automotive vehicle having engine starting means, said electrical circuit comprises a switch operatively connected to said key-operated means and a second electromagnet connected in parallel relation to said first-named electromagnet for locking said engine starting means against motion when said circuit is broken and to un-

2 lock said engine starting means when said circuit is completed.

The invention will be better understood and other objects, characterizing features, details and advantages thereof will appear more clearly as the following explanatory description proceeds with reference to the accompanying diagrammatic drawings given by way of examples only illustrating various forms of embodiment of the invention and wherein:

FIG. 1 is a sectional view of an anti-theft device according to the invention mounted on the steering column of an automotive vehicle FIGS. 2 and 3 are enlarged views of a structural detail of the anti-theft device shown in FIG. 1 and illustrating its operation FIG. 4 is a top view corresponding to FIG. 2;

FIG. 5 is a schematic diagram showing the electrical arrangement for the anti-theft device according to the invention;

Figure 6:
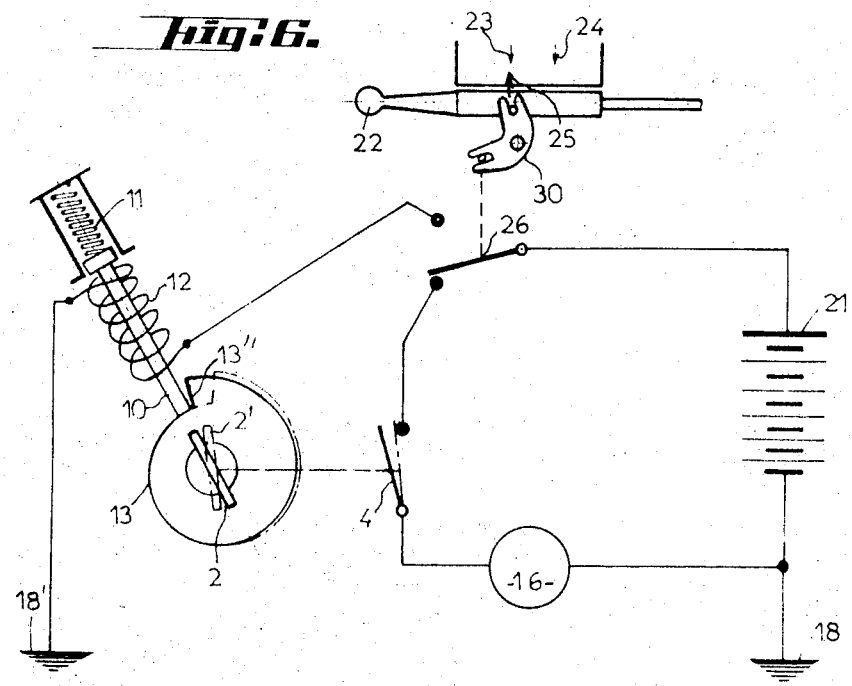
FIG. 6 is a similar diagram of a second embodiment of the invention shown in the position when the engine is running.

In FIG. 1 is shown the safety lock 1 of an anti-theft device provided with its key 2. Through rotation of the key 2, the finger 4a of the rotor of the lock 1 moves the bolt 3 along together with the electric switch 4 provided below. The bolt 3 engages in the usual manner an opening forming a bolt-clasp or like strike-box formed in the ring or collar 7 fastened to the steering column 6 of the vehicle, the casing 19 of the anti-theft device being secured to the tube 5 of the steering column 6.

A housing or like recess formed in the casing 19 of the anti-theft device accommodates the long-pull electromagnet 12 together with its plunger core 10 which is urged or retractable upwards by a biasing drawback spring 11 when the electromagnet is not energized, that end of said core which is opposite to said biasing spring being connected to the lower arm of a cranked lever 9 bent at right angles the other end of which actuates a lock or like latch means 8.

The spring 11 is effective to constantly urge or push the end of the latch 8 to bear against the periphery of a circular base or plate 13 integral with the rotor of the safety lock of the anti-theft device. This base or plate 13 is formed with a notch 13' engageable by the end of the latch 8 when the latter is registering therewith.

It is seen in FIG. 5 that the electromagnet 12 is electrically connected in parallel with the indicator lamp 17 of the instrument carrier panel or dashboard of the vehicle and both are fed by the electric storage battery of the vehicle upon closing a switch 15 hydraulically operated through a lack of pressure such for example as an oil pressure-operated switch the closing of which is caused by a lack of pressure that is when the engine is stopped.

In FIG. 5 is also shown the lead 14 connected to the positive pole of the storage battery as well as the starter 16 which is for instance turned on by the switch 4 incorporated to the anti-theft device. The reference numeral 20 designates the main or master switch or circuit breaker of the vehicle which may be mounted on the dashboard or integrated to the switch 4 of the anti-theft device. The reference numerals 18, 18' and 18"

denote the leads connecting back to the common ground and connected to the negative supply terminal of the storage battery.

The operation of the device described hereinabove is the following:

When the vehicle is at rest with the engine stopped and when the anti-theft device is locked to the steering column, the bolt 3 of the safety lock of the anti-theft device is then inserted into the opening formed in the collar 7, the latch 8 is urged against the base 13 by the biasing spring 11 but does not yet register with the notch 13'. The switch 15 hydraulically operated by a lack of pressure is closed and when the switch 20 is closed either by turning the key 2 of the anti-theft device or by directly making the contacts of said switch, the electromagnet 12 is suppled with electric power by the storage battery of the vehicle. The energizing of the electromagnet 12 causes then the core 10 to be retracted against the action of spring 11, the latch 8 is then moved away from the periphery of the base 13 (FIG. 3). The key 2 of the safety lock of the anti-theft device may then be rotated freely until closing the switch 4 connected in the feed circuit for the starter 16. As soon as the engine is running, the oil pressure builds up therein and the switch 15 cuts off the feed circuit for the elctromagnet. The latch 8 is then pushed by the spring 11 towards the base 13 in engaging relationship with the periphery thereof. Then, when the pressure exerted upon the key 2 is released to cut off the feed circuit for the starter 16, the mechanism of the anti-theft device moves the rotor of the safety lock automatically back to an intermediate position and the notch 13' of the base 13 then registers with the finger or latch 8 which moves then into said notch under the action of spring 11. The rotor of the safety lock of the anti-theft device is then locked.

When stopping the engine, the switch 15 is closed again thereby causing the electromagnet 12 to be energized and the latch 8 to be withdrawn from the notch 13'. The rotor is unlocked and the anti-theft device may be locked again to the steering column, the bolt 3 engaging the opening of the collar 7 only after withdrawal of the key 2 from the safety lock 1 of the anti-theft device.

In FIGS. 6 to 9 have been shown two alternative embodiments of the invention relating more particularly to the case where a connection is provided between the anti-theft device and the control means of the injection pump of the engine or the decompression control means.

In these FIGURES, the reference numeral 22 designates the pull handle or operating lever for controlling the injection pump or for actuating the decompression of the engine. This lever 22 carries a mark 25 the position of which is defined with respect to two stationary marks 23 and 24, the mark 23 corresponding to the position of the movable mark 25 when the engine is running and the mark 24 corresponding to the position of the movable mark 25 when the engine is stopped.

In both of these particular embodiments, the base 13, which is rotatably driven by the key 2, exhibits a nose or like shoulder 13" adapted to abut against the core 10 of the electromagnet 12, said core 10 being urged by the spring 11 against the pull exerted upon said core when the electromagnet 12 is energized.

Figure 7:
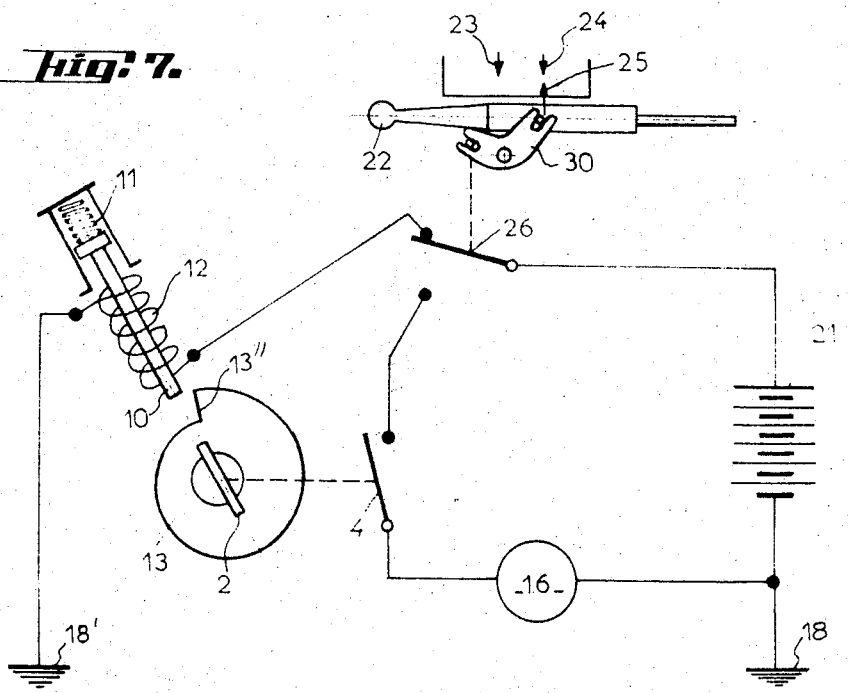
FIG. 7 is a view corresponding to FIG. 6, showing the position when the engine of the vehicle is at rest.

In the embodiment shown in FIGS. 6 and 7, the lever 22 is operatively connected by a connecting member 30 to an electrical change-over switch 26 which is connected on the one hand to the storage battery 21 of the vehicle and on the other hand either to the electromagnet 12 or to the starter 16 for the vehicle engine. Thus the electromagnet 12 is energized by the storage battery 21 when the throw-over switch 26 is in the upper position shown in the drawing whereas the starter 16 is connected to the storage battery when the throw-over switch 26 is in its lower position and the switch 4 actuated by the anti-theft device is closed.

The operation of the change-over switch 26 is mechanically effected by said connecting member 30 consisting for instance of a cranked part bent at right angles one arm of which is connected to the change-over switch 26 whereas the other arm is connected to the lever 22.

Any other mechanical system kinematically converting the translatory motion of the lever 22 into a motion actuating the change-over switch 26 may also be used.

When the anti-theft device is in the unlocked position that is when it does not lock the steering column and when the lever 22 is in the "running" position (mark 25 registering with mark 23), the electromagnet 12 is not energized and the movable core 10 thereof bears against the base 13 as shown in FIG. 6. The nose 13" when abutting against the movable core 10 prevents any rotation of the base 13 in the counter-clockwise direction and thereby prevents any locking of the anti-theft device. Such a position of the anti-theft device corresponds to the normal running of the engine.

The start of the engine is effected as follows: the lever 22 is pulled until mark 25 registers with mark 23, the change-over switch 26 is closed to complete the feed circuit for the starter 16 and the electromagnet 12 is not energized. The rotation of the key 2 causes the switch 4 to be closed, this corresponding to the "start" position of the rotor of the anti-theft device. The starter 16 is then fed with power by the electrical circuit comprising the storage battery 21, the change-over switch 26, the switch 4 and the ground 18'. When the engine has been started, the driver releases the key 2 of the anti-theft device which is moved resiliently back to the position corresponding to the normal running of the engine, whereby the switch 4 is opened and cuts off the feed circuit for the starter 16. The electromagnet 12 is not energized and the movable core 10 thereof thus prevents any locking of the anti-theft device. Conversely the engine is stopped by pushing the lever 22 back until the mark 25 registers with the mark 24 as shown in FIG. 7. The change-over switch 26 has then been moved to the upper position in the drawing and the electromagnet 12 is energized. The movable core 10 is then caused to be retracted against the action exerted by the spring 11 thereby disengaging the nose 13" of the base 13 and enabling to lock the anti-theft device. When the key 2 is withdrawn from the safety lock of the anti-theft device, the bolt of said lock is then moved to the extended position to lock the steering column as previously stated.

The invention also provides cut-off means for the circuit feeding the electromagnet 12, which have not been shown in the drawings so as to avoid keeping any live voltage applied to said electromagnet 12 when the vehicle has been left in a parking place.

Figure 8:
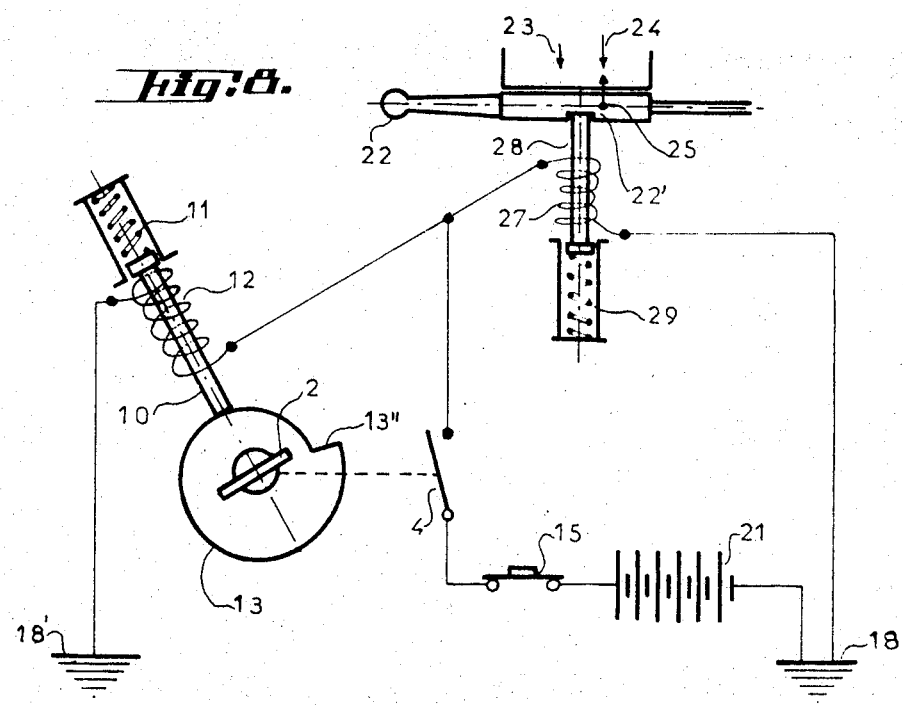
FIGS. 8 and 9 are two diagrammatic views of a third embodiment of the invention, illustrating its operation.
Figure 9:
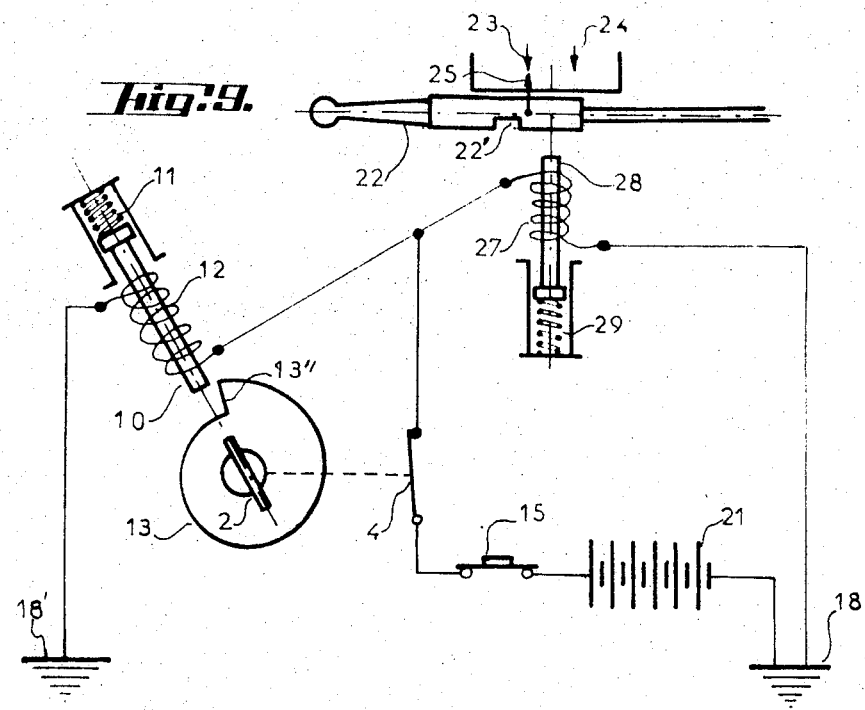

In the embodiment of the invention shown in FIGS. 8 and 9, the lever 22 for controlling the injection pump of the engine or for actuating the decompression comprises a notch 22' engageable by the movable core 28 of a second long-pull electromagnet 27, the movable core 28 being engageable with the notch 22' under the action of a biasing spring 29 when the electromagnet 27 is not energized.

Both electromagnets 12 and 27 are fed in parallel by an electrical circuit including the storage battery 21 of the vehicle, a switch 15 hydraulically operated by a lack of pressure, a switch 4 operatively connected to the anti-theft device and the ground 18 and 18', respectively.

The switch 15 is caused to be closed by a lack of oil pressure that is when the engine is stopped.

The operation of this alternative embodiment of the invention is the following:

When the anti-theft device is locked and the lever 22 is in the engine stop position (FIG. 1, mark 25 registering with mark 24), the anti-theft device is unlocked by turning the key 2 until the base 13 is brought into the position shown in FIG. 1. At this time the anti-theft device is unlocked but the lever 22 is still held against motion by the movable core 28 of the electromagnet 27. The switch 15 is closed by a lack of oil pressure and further rotation of key 2 causes the switch 4 to be closed whereby the start of the engine is effected. Both electromagnets 12 and 27 are then energized and cause the movable cores 10 and 28 to be retracted or moved backwards. The lever 22 is unlocked and may be brought in a position corresponding to the normal running of the engine that is when the mark 25 registers with the mark 23. The engine start is then effected by any means whatever, the oil pressure builds up and causes the switch 15 to open. The lever 22 remains in the aforesaid position as shown in FIG. 2. The movable core 10 of the electromagnet 12 engages again the base 13 and prevents any locking of the anti-theft device due to the nose 13" of the base 13 abutting against said movable core 10.

The movable core 28 of the electromagnet 27 is caused to abut against the lever 22 but without being able to enter the notch 22' hence without locking the lever 22. Thus the engine may not be started by any means whatever when the anti-theft device locks the steering column and conversely the anti-theft device may not be locked when the engine is running. Moreover due to the interdependency of the electromagnets 12 and 27 a double safety has been achieved thereby.

It should be noted that the electric starter has not been shown in FIGS. 8 and 9 since the modification illustrated therein may be applied as well to the case of a mechanical or pneumatic starter as to the case of an electric starter fed through an independent switch of the device.

It should be understood that the invention is not at all limited to the forms of embodiment described and shown which have been given by way of examples only. In particular it comprises all the means forming technical equivalents to the means described as well as their combinations if same are carried out according to the gist of the invention as defined in the appended claims.

What is claimed is:

1. In an anti-theft device having a lock including key operated means, first and second blocking means, each constituted of an electromagnet and a movable core, said first blocking means being adapted to cooperate with said key operated means, said second blocking means being adapted to engage a control element of an automotive vehicle, said key operated means having a first position, in which said movable core of said second blocking means is engaged in said control element and a second position in which said movable core is disengaged from said control element, the improvement in which said second blocking means is included in an electrical circuit carrying the operating current for said vehicle, to respond to a closed condition of said circuit to cause said first blocking means to permit movement of said key operated means between said two positions and to respond to an open condition of said circuit to cause said blocking means to block the movement of said key operated means from said second into said first position.

2. In an anti-theft device according to claim 1 for an automotive vehicle having a Diesel engine and engine starting means, in the improvement in which the electro-magnets of said first and said second blocking means are mounted in parallel in said electrical circuit carrying the operative current for said vehicle, and said circuit comprises a first switch operatively connected to said key operated means so as to close the switch, when said key operated means are in said second position, and a second switch mounted in series with said first switch and being operated by said engine starting means, so as to open said second switch when the vehicle is running, said first and second blocking means being in engageable condition when said circuit is broken and said electromagnets are not energized.

3. In an anti-theft device according to claim 2, the Diesel engine including injection pump means, in the improvement in which the control element comprises a control lever for the pump means, said engine starting means includes said control lever, said control lever has a notch and said second electromagnet comprises a movable core insertable in said notch when said circuit is broken and withdrawable from said notch when said circuit is completed.

4. In an anti-theft device according to claim 2, the Diesel engine including pressure releasing means, in the improvement in which the control element comprises a control lever for said pressure releasing means, said control lever has a notch and said second electromagnet comprises a movable core insertable in said notch when said circuit is broken and withdrawable from said notch when said circuit is completed.

* * * * *